(12) United States Patent
Scott et al.

(10) Patent No.: US 8,140,404 B1
(45) Date of Patent: Mar. 20, 2012

(54) BROWSING WITH STATIC PAGES

(75) Inventors: Sean M. Scott, Sammamish, WA (US);
Devraj Varadhan, Bellevue, WA (US);
Douglas J. Gradt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/007,316

(22) Filed: Jan. 14, 2011

(51) Int. Cl.
*G06Q 30/00* (2006.01)
(52) U.S. Cl. .................................... 705/26.1
(58) Field of Classification Search .............. 705/26, 705/27, 26.1
See application file for complete search history.

(56) References Cited

U.S. PATENT DOCUMENTS 6,976,231 B1 * 12/2005 Funahashi ...................... 715/853
2010/0257456 A1 * 10/2010 Lieb et al. ...................... 715/741

OTHER PUBLICATIONS

Farroha, Bassam Sabri; Florida Institute of Technology, 1996, 435 pages; AAT 9627511 A novel approach to design a massively parallel application specific architecture for image recognition systems, http://proquestumi.com/pqdweb?did=742628361&sid=3&Fmt=2&clientId=19649&RQT=309&VName=PQD.*

* cited by examiner

*Primary Examiner* — Mila Airapetian
(74) *Attorney, Agent, or Firm* — Thomas, Kayden, Horstemeyer & Risley, LLP

(57) ABSTRACT

Disclosed are various embodiments for showing images and information associated with a plurality of items individually for each item in a network page. In one embodiment, a page generator generates a network page comprising an image layer and an information layer where the information layer is superimposed over the image layer. The image layer includes an image depicting the item and the information layer depicts information describing the item. Further, the network page may include a set of navigation controls that, when manipulated, triggers a client side application to shift the image currently shown in the image layer out and shift in a new image into the image layer. Contemporaneously, the client side application also replaces the information in the information layer with new information associated with the new image.

18 Claims, 5 Drawing Sheets

BROWSING WITH STATIC PAGES

BACKGROUND

Users may browse through items on web pages presented by electronic commerce systems in order to identify items for purchase. Typically, search results listing a number of items are presented. Users often select from the items to view a detail page presenting more detailed information about such items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to browsing items available for purchase in an electronic commerce system by shifting the item images in and out of an image layer on a client device. In the following discussion, a general description of the system and its components is provided, followed by a discussion of the operation of the same.

Figure 1:
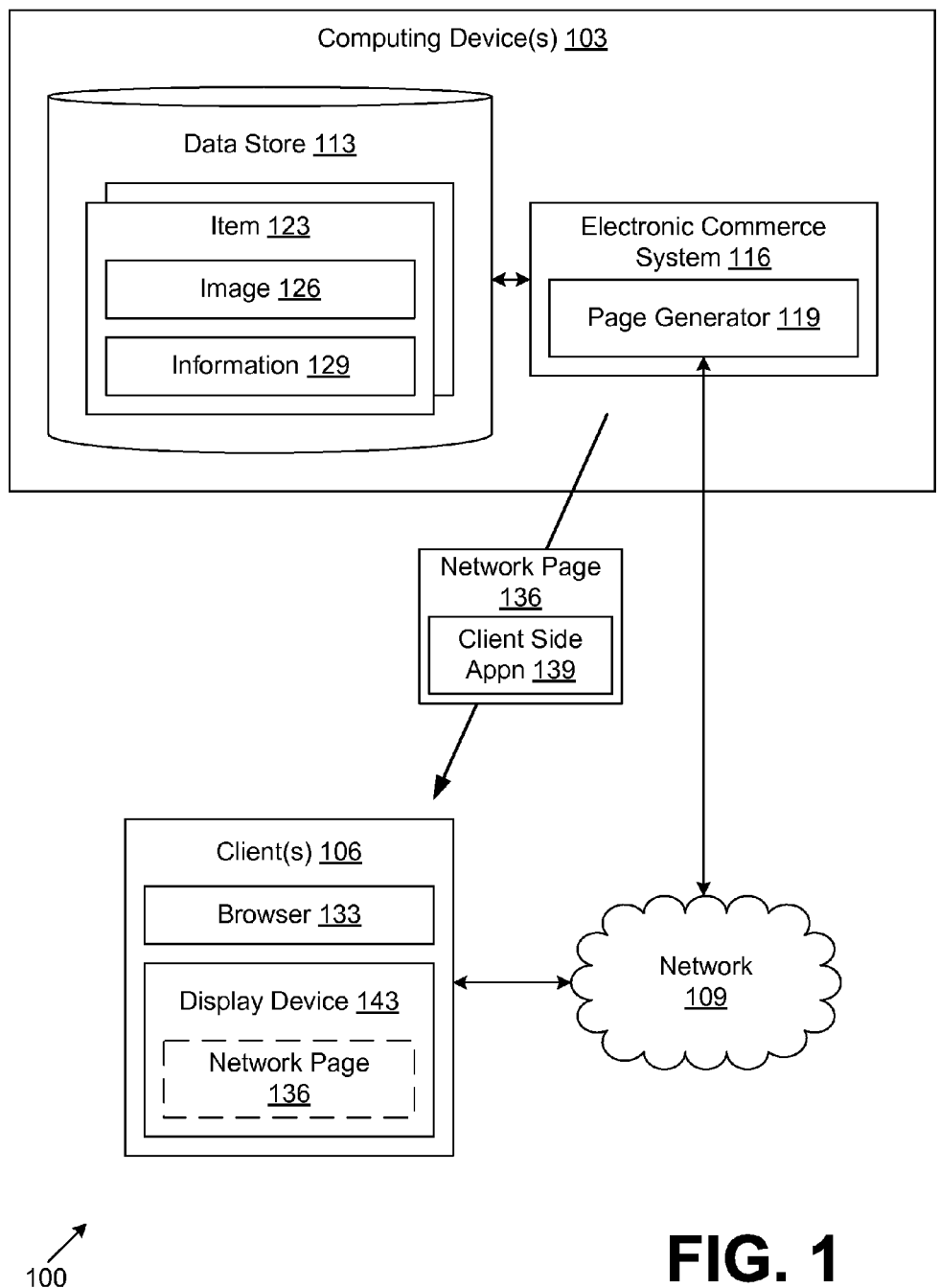
FIG. 1 is a drawing of networked environment according to various embodiments of the present disclosure.

With reference to FIG. 1, shown is a networked environment 100 according to various embodiments. The networked environment 100 includes a computing device 103, a client 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include an electronic commerce system 116 and other applications, services, processes, systems, engines, or functionality not discussed in detail herein. The electronic commerce system 116 includes various components such as a page generator 119 and other applications and processes.

The electronic commerce application 116 is executed in order to facilitate the online purchase of items over the network 109. The electronic commerce application 116 also performs various backend functions associated with the online presence of a merchant in order to facilitate the online purchase of items 123 as will be described. For example, the electronic commerce application 116 generates network pages 136 such as web pages or other types of network content that are provided to clients 106 for the purposes of selecting items for purchase, rental, download, lease, or other form of consumption as will be described.

Additionally, the page generator 119 is configured to generate the network pages 136 (such as web pages) and/or client side applications 139 in response to requests such as HTTP requests from the client 106 in association with the operation of the electronic commerce system 116. Such network pages and/or client side applications may be rendered and/or executed on the client device 106 for various purposes. In one embodiment, the client side applications 139 may be embedded within network pages 136 such as web pages and the like, as will be described. Alternatively, such client side applications 139 may be transmitted to the client devices 106 in some other format to be executed thereon.

The data stored in the data store 113 includes, for example, items 123 and potentially other data. Each of the items 123 is sold, for example, to customers through the electronic commerce system 116. Associated with each item 123 is an image 126 that may depict, for example, one or more views of the item 123 that is available for purchase in the electronic commerce system 116. Also associated with each item 123 is information 129 that may comprise, for example, detail information about the item 123, purchasing information, shipping information, preferences specific to the item 123, and/or any other information related to the item 123. For instance, purchasing information may include pricing information, discount information, methods of payment, and/or any other information related to purchasing the item 123. Further, shipping information may include shipping discounts, projected dates of delivery, forms of delivery, carrier information, and/or any other information related to shipping the item 123. Additionally, preferences specific to the item 123 may include a size preference, a color preference, a design preference, and/or any other preference that may be specific to the item 123.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser 133 and/or other applications. The browser 133 may be executed in a client 106, for example, to access and render network pages 136, such as web pages, or other network content served up by the computing device 103 and/or other servers. The rendered network pages 136 or other content are viewed on a display device 143. In one embodiment, the network page 136 includes the client side application 139 that implements a variety of functions that dictate how a network page 136 is rendered and how users may interact with the network page 136 as will be described. The client side application 139 may be embedded in the network page 136 that is executed as needed. Further, the client side application 139 may access functionality of the browser 133 for various purposes as will be described. In this respect, the functionality of the browser 133 may be viewed as an extension of the client side application 139.

In another embodiment, the client side application 139 may not be embedded in the network page 136 and instead may be provided to and executed by the client 106 in some other manner. In addition, the client 106 may be configured to execute applications beyond the browser 133 such as, for example, email applications, instant message applications, and/or other applications.

Next, a general description of the operation of the various components of the networked environment 100 is provided. A user on client 106 may manipulate the browser 133 to submit a request for an item search to the electronic commerce system 116. Upon performing the item search, one or more items 123 may be responsive to the request that may be presented to the user. The page generator 119 generates a network page 136 to present the results of the search to the user. According to various embodiments, the network page 136 includes the client side application 139. The network page 136 is sent to the client device 106 in response to the request. The network page 136 is rendered in order to facilitate viewing of the items 123 on the display device 143 of the client device 106. The client side application 139 is executed during the rendering of the network page 136 and controls the presentation of items 123 on the display device 143 as will be described.

Figure 2:
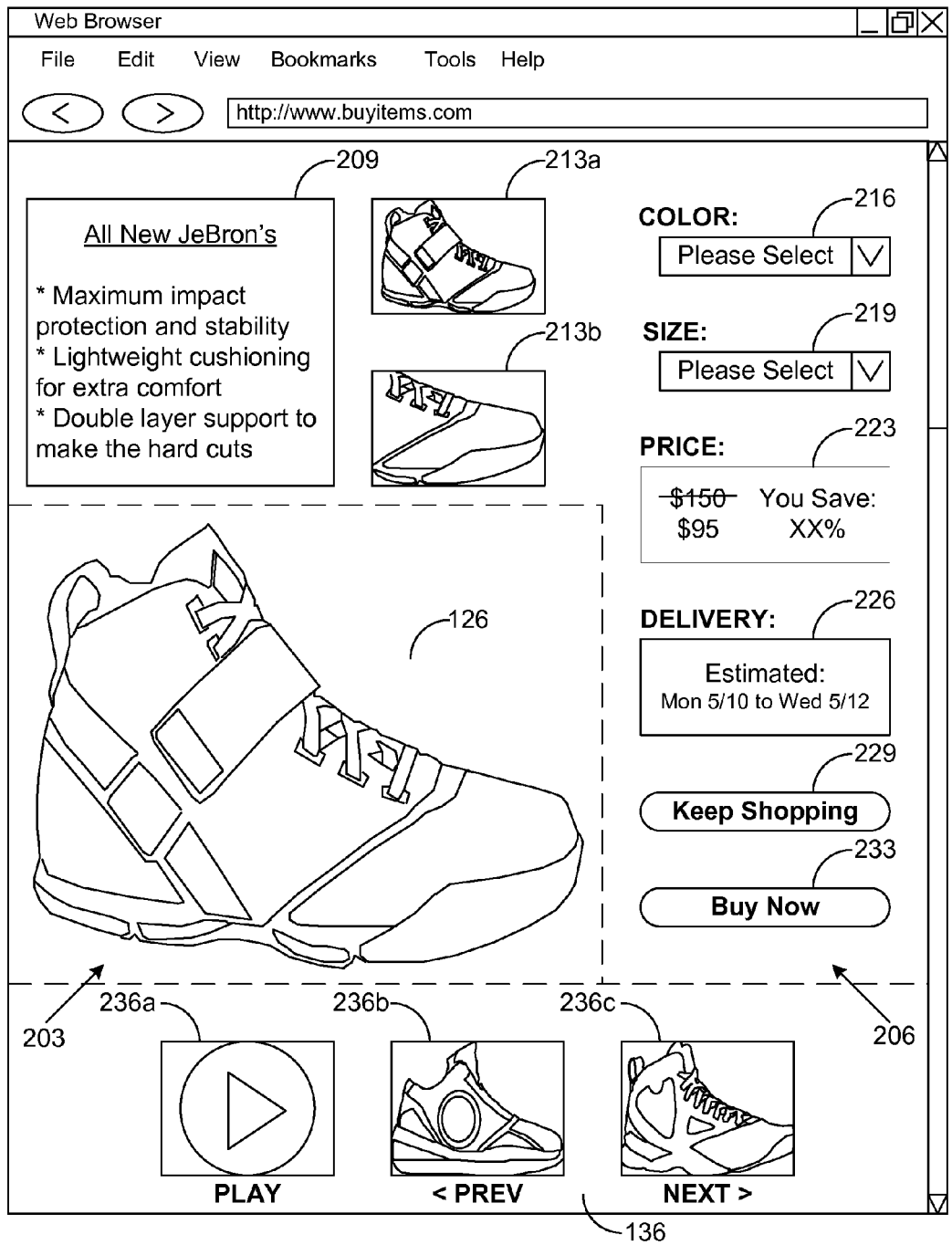
FIGS. 2 and 3 are drawings illustrating examples of a user interface rendered by a client in the networked environment of FIG. 1 according to various embodiments of the present disclosure.

Referring next to FIG. 2, shown is one example of a network page 136, according to various embodiments of the present disclosure. The various graphical components such as the blocks comprising different information shown in FIG. 2 are merely examples of the various types of features that may be used to accomplish the specific functions noted. The network page 136 is rendered on a display device 139 associated with the client 106 (FIG. 1) according to various embodiments. In another embodiment, FIG. 2 may be viewed as depicting the display output of the client side application 139 (FIG. 1), according to various embodiments of the present disclosure.

In one embodiment, the page generator 119 (FIG. 1) generates the network page 136 to display the results of a request for an item search submitted to the electronic commerce system 116 (FIG. 1). As shown, network page 136 depicts the item detail associated with each item 123 (FIG. 1) individually. In one embodiment, the network page 136 comprises an image layer 203 and an information layer 206. The image layer 203 and information layer 206 are shown in dotted lines, for example, because they may not be visible on the network page 136. Also, a given layer 203 or 206 may extend throughout the entire view of the network page 136. In one embodiment, the information layer 206 is superimposed over the image layer 203. Additionally, the page generator 119 may include other layers to the network page 136 that may provide additional content.

The image layer 203 includes an image 126 (FIG. 1) that depicts an item 123 available for purchase in an electronic commerce system 116 (FIG. 1), as described above. In this example, the image 126 is of a shoe that can be purchased by a user on the electronic commerce system 116. The information layer 206 includes the information 129 (FIG. 1) that describes the item 123 being depicted in the image layer 203. In this example, the information layer 206 includes an item description box 209, item views boxes 213a/213b, a color selector 216, a size selector 219, a price box 223, a delivery box 226, a keep shopping button 229, and a buy now button 233.

In one embodiment, the item description box 209 depicts features of the item 123, such as, for instance, marketing information describing the item 123. The item views boxes 213a/213b include other images 126 of the item 123 that depict the item 123 from other viewpoints. The color selector 216 provides for selecting from a variety of colors available for the item 123. The size selector 219 provides for selecting from a variety of sizes available for the item 123. The price box 223 includes the cost for purchasing the item 123 and any discounts that may be available at the time of purchase. Further, the delivery box 226 includes an estimated delivery date of the item 123 if the item 123 were to be purchased. Finally, the keep shopping button 229 provides for adding the item 123 to a shopping cart and the buy now button 233 provides for immediate purchase of the item 123.

According to one embodiment, one or more images 126 of items 123 are shifted into and out of the image layer 203. The network page 136 includes navigation controls 236a/236b/236c to initiate the shifting of the images of the items 123. For instance, a play navigation control 236a provides for automatic browsing of a plurality of items 123 in a sequential slideshow approach as will be described. A previous navigation control 236b provides for shifting back to the previous item 123 and a next navigation control 236c provides for shifting ahead to the next item 123. A manipulation of a navigation control 236b/236c directs the client side application 139 to cause an image 126 to be shifted out of image layer 203 and a new image 126 to be shifted into the image layer 203, as will be described. Additionally, the information 129 (FIG. 1) may also be replaced contemporaneously into the information layer 206 with the shifting of the images 126. Furthermore, in one embodiment, the navigation controls 236b/236c may include a thumbnail image 126 of the item 123 that is to be shifted into the image layer 203 upon manipulation of that navigation control 236b/236c.

Figure 3:
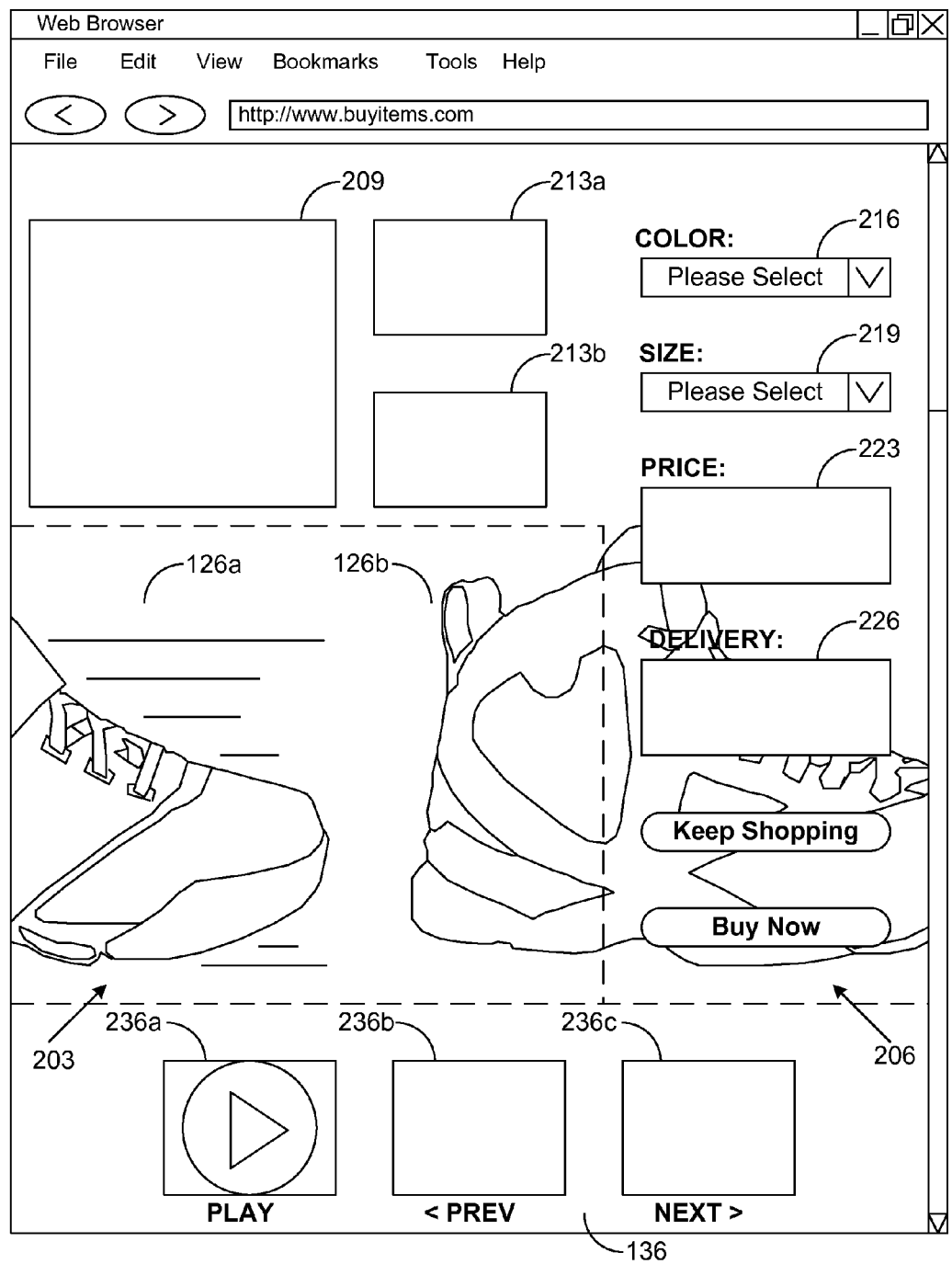

Turning now to FIG. 3, shown is one example of a network page 136, according to various embodiments of the present disclosure. The various graphical components such as the blocks comprising different information shown in FIG. 3 are merely examples of the various types of features that may be used to accomplish the specific functions noted. The network page 136 is rendered on a display device associated with the client 106 (FIG. 1) according to various embodiments. In another embodiment, FIG. 3 may be viewed as depicting a display output of the client side application 139 (FIG. 1), according to various embodiments of the present disclosure.

A general description of the operation of the various components presented in FIG. 3 is provided. The network page 136 of FIG. 3 shows a shifting of images 126 such that the network page 136 is able to sequentially depict each item 123 (FIG. 1) and the information 129 (FIG. 1) associated with the item 123 on the network page 136. Thus, a user may individually view images 126 (FIG. 1) and the associated information 129 of multiple items 123 on a single network page 136 without submitting a request to view a completely new network page(s) 136 for each item 123.

In one embodiment, the user manipulates a respective navigation control 236b/236c to display a new item 123. In response, the client side application 139 shifts images 126 in and out of the image layer 203 such that the network page 136 shows each item 123 individually. For example, the client side application 139 shifts image 126a out of the image layer 203 upon manipulation of the navigation control 236c. For instance, if the next navigation control 236c is manipulated, the client side application 139 shifts the image 126a to the left and out of the image layer 203 while shifting image 126b from the right into the image layer 203. Further, the shifting of the images 126a/126b is performed such that a user sees the old image 126a being shifted out of the image layer 203 and the new image being shifted into the image layer 203. In one embodiment, the shifting may occur in a horizontal direction relative to a display device 143 (FIG. 1) such as, for instance, right to left and/or left to right. In another embodiment, the shifting may occur in a vertical direction relative to a display device 143 such as, for instance, top to bottom and/or bottom to top. Further, the shifting may occur in any direction relative to the display device 143, such as, diagonally or in other directions, a combination of different directions, and/or any other direction. Such directions may be randomized from one shift to the next.

Additionally, in one embodiment the images 126a/126b are shifted into the image layer 203 such that the images 126a/126b appear to be moving behind the information layer 206. In particular, the information layer 206 is superimposed over the image layer 203, as described above. When the client side application 139 causes the shifting of the images 126a/126b, the shifting images 126a/126b may be visible in any space not filed by components of the information layer 206 while shifting behind the information layer 206. For instance, as shown in FIG. 3, the information layer 206 includes components disposed on the right side of the display. The old image 126a may shift out of the image layer 203 to the left and the new image 126b may shift into the image layer from the right. While shifting from the right, portions of the new image 126b may be visible through any empty portion of the information layer 206 as shown in FIG. 3.

Contemporaneously with the shifting of images 126a/126b, the client side application 139 replaces the information 129a in the components or portions of the information layer 206 with information 129b that is associated with the image 126b newly shifted into the image layer 203. In this example, the item description box 209, the item views boxes 213a/213b, the color selector 216, the size selector 219, the price box 223, and the delivery box 226 may be presented in an empty state while the images 126a/126b are shifting as shown. Additionally, the keep shopping button 229 (FIG. 2) and the buy now button 233 (FIG. 2) remain unchanged and visible on the network page 136 while the new content is being shifted into the network page 136.

In another embodiment, the content of the components of the information layer 206 may be shifted in and out of the information layer 206 in a similar manner as the images 126a/126b are shifted in and out of the image layer 203. Further, the thumbnail images 126 included in the previous navigation control 236b and the next navigation control 236c may also be replaced contemporaneously with the shifting of the images 126a/126b.

In another embodiment, an auto play navigation control 236a included in the network page 136 provides for automatic browsing of the items 123. For instance, manipulation of the auto play navigation control triggers automatic browsing where the client side application 139 shifts a new image 126b into the image layer and shifts the old image 126a out of the image layer automatically on a periodic basis. Specifically, the client side application 139 may shift a new image 126b into the image layer after the old image 126a was depicted in the image layer for a predefined period of time. Further, the auto play navigation control 236a may be configured to allow for manual input of the amount of time the client side application 139 waits before shifting in a new image 126a, or a slider or other mechanism may be presented to adjust the viewing time of each image 126. Additionally, as described above, the new information 129b associated with each new image 126b is also replaced in the information layer contemporaneously with the shifting of the images 126a/126b.

In one embodiment, the page generator 119 may gather all of the images 126 and information 129 associated with all of the items 123 identified from the item search and send all of the gathered components to the client 106 with the network page 136 where they may be individually shown in a network page 136, as described above. In this respect, the client 106 may store all of these components in a memory associated with the client 106 and/or any other type of data store. Further, the page generator 119 may communicate all of these components to the client 106 such that a search results page may be rendered on the client 106 that presents all of the items 123 identified from the item search. Selecting an item 123 from the search results page may then cause a detail page to be rendered for the selected item 123, such as, for instance, network page 136. Thus, the page generator 119 may make a single communication of all of the images 126 and information 129 associated with the items 123 identified from the item search to the client 106. For instance, all of the components may be communicated in a compressed object file using compression utility such as zip, gzip, bzip2, tar, and/or any other type of compression utility.

Additionally, in another embodiment, the page generator 119 may gather the images 126 and information 129 associated with a predefined number of the items 123 identified in the search results, where the predefined number is a subset of all of the items 123 identified in the search results. For instance, the page generator 119 may communicate the images 126 and the information 129 associated with a selected item 123 and a small number of other items 123 appearing adjacent to the selected item 123 in the queried results. As a customer browses through the items 123, requests may be sent for additional images 126 and information 129 of other items 123 by the client side application 139 and the page generator 119 may send the images 126 and information 129 to the client 106 in response. Thus, in this approach, images 126 and information 129 of items 123 are sent to the client 106 on an "as needed" basis as a user on the client 106 browses through the items 123 from the search results. For instance, the page generator 119 may communicate images 126 and information 129 such that the client 106 has a threshold number of new images 126 and information 129 accessible in a memory before and after the currently viewed item 123. In one embodiment, the threshold number may depend on the capacity of the memory accessible by the client 106.

Figure 4:
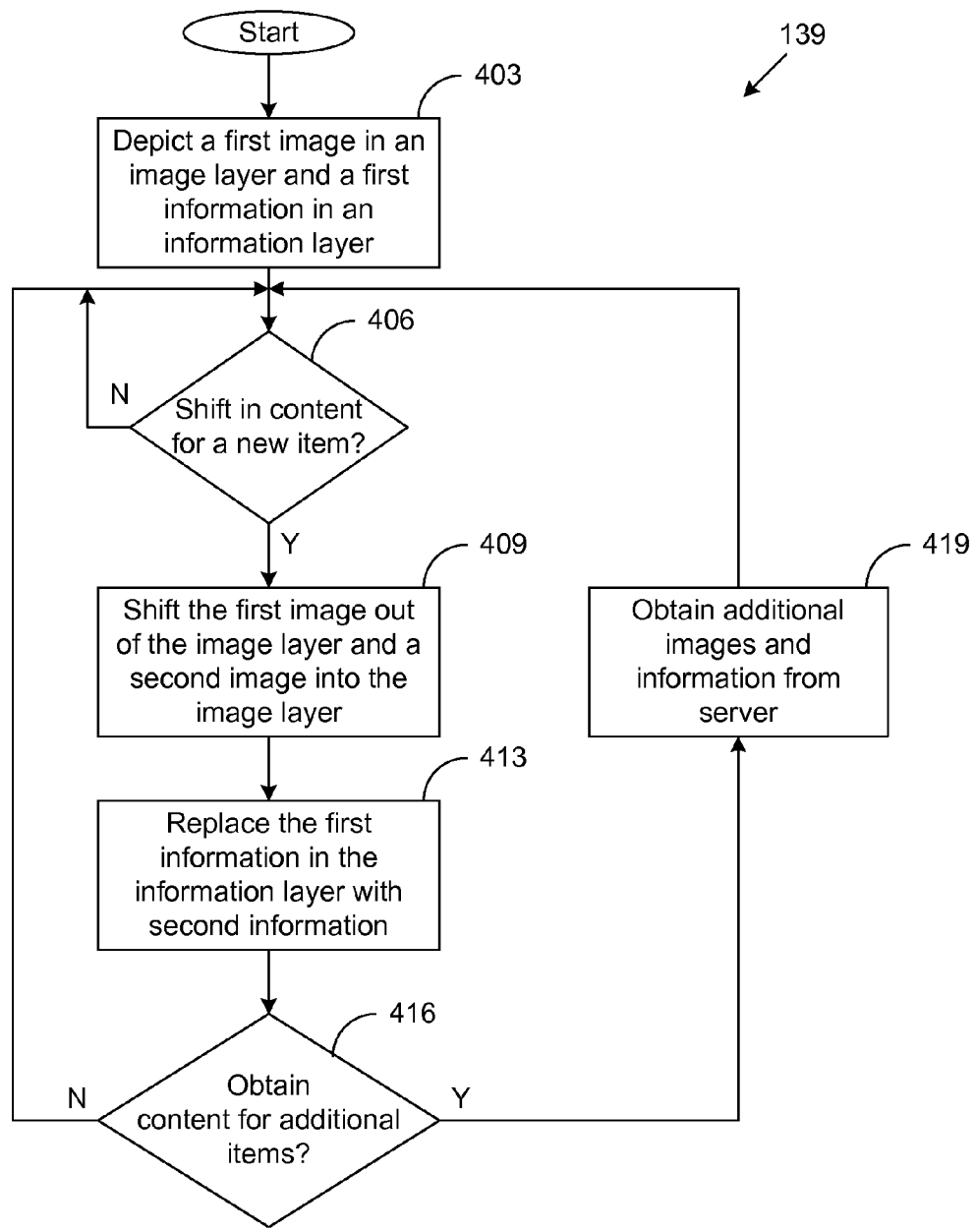
FIG. 4 is a flowchart illustrating one example of functionality implemented as a portion of a client side application executed in a computing device in the networked environment of FIG. 1 according to various embodiments of the present disclosure.

Referring next to FIG. 4, shown is a flowchart that provides one example of the operation of a portion of the client side application 139 according to various embodiments. It is understood that the flowchart of FIG. 4 provides merely an example of the many different types of functional arrangements that may be employed to implement the operation of the portion of the client side application 139 as described herein. As an alternative, the flowchart of FIG. 4 may be viewed as depicting an example of steps of a method implemented in the client 106 (FIG. 1) according to one or more embodiments.

According to one embodiment, the page generator 119 (FIG. 1) generates a network page 136 (FIG. 1) that provides for browsing a plurality of items 123 (FIG. 1) available for purchase in an electronic commerce system 116 (FIG. 1) where each item 123 may be viewed individually without having to load a completely new network page 136. Embedded in the network page 136 (FIG. 2) is the client side application 139 that shifts images 126 (FIG. 1) in and out of an image layer rendered on a display device 143 (FIG. 1) of a client 106 (FIG. 1). Further, the client side application 139 replaces the information 129 (FIG. 1) in the information layer contemporaneously with the shifting of the images 126.

Beginning with box 403, the client side application 139 is executed when rendering the network page 136 such that a first image 126*a* is included in the image layer 203 (FIG. 2). The first image 126*a* (FIG. 2) may depict a first item 123*a*, as described above. Additionally, the page generator 119 (FIG. 1) includes first information 129*a* in the information layer 206 (FIG. 2), as described above. The first information 129*a* comprises a detailed description of the item 123*a* such as product information, manufacturing information, warranty information, product reviews, and/or any other type of description of the item 123*a*. Furthermore, in one embodiment, the information layer 206 may be superimposed over the image layer 203 and the layers 203/206 may overlap.

Next, in box 406, the client side application 139 determines whether to shift in content for a new item 123 to be depicted on the network page 136. In one embodiment, the user submits a request to display new content, for example, by manipulating a set of navigation controls 236 (FIG. 2) included as part of the network page 136. For instance, the navigation controls 236 may include a next button, a previous button, an auto play button, and/or any other type of navigation control, as described above. The client side application 136 determines if the user requested content for a new item 123 and proceeds to box 409 if the user makes such a request. An inactivity timeout period may be associated with the client side application 136 in the event that the user does not request content for a new item, or the network page 136 may remain static until action is taken.

Next, in box 409, the client side application 139 shifts the first image 126*a* out of the image layer 203 and shifts a second image 126*b* into the image layer 203 upon manipulation of a respective navigation control 236. In one embodiment, the client side application 139 shifts the images 126*a*/126*b* in a horizontal direction relative to a display device 143. In another embodiment, the client side application 139 shifts the images 126*a*/126*b* in a vertical direction relative to the display device 143. Additionally, the client side application 139 may implement the shifting in any other direction relative to the display device 143, such as, for instance, diagonally, in a randomized direction, in a combination of different directions, and/or any other direction. Further, the navigation control 236 may be a previous item button and/or a next item button that may be manipulated to trigger the client side application 139 to provide another item 123 for the network page 136, as described above. In another embodiment, the navigation control 236 may be an auto play button that periodically triggers the client side application 139 to automatically shift the items 123.

Further, in box 413 the client side application 139 replaces the first information 129*a* associated with a first item 123*a* in the information layer 206 with second information 129*b* associated with a second item 123*b* contemporaneously with the shifting of the images 126*a*/126*b*. In one embodiment, the first information 129*a* may be shifted out of the components of the information layer 206 and the second information may be shifted into the components of the information layer 206 in a similar manner as the images 126*a*/126*b* being shifted in and out of the image layer.

For instance, the client side application 139 may shift the information 129*a*/129*b* in and out of the information layer 206 directionally relative to the display device 143, such as, for instance, horizontally, vertically, diagonally, and/or any other direction. Further, all of the images 126 and the information 129 from the item search may be stored locally on the client 106, as described above. Alternatively, the client side application 139 may request the images 126 and the information 129 from the page generator 119 dynamically on an "as needed" basis as the user browses through the items 126, as described above.

Next, in box 416, the client side application 136 determines if images 126 and information 129 for additional items 123 need to be obtained. For instance, in one embodiment, the client side application 136 may initially receive images 126 and information 129 associated with a predefined number of items 123, as described above. The client side application 136 stores this content associated with items 123 in a memory accessible by the client 106 (FIG. 1). Once the user has browsed through the content associated with the predefined number of items 123 received by the client side application 136, the client side application 136 may obtain the content associated with additional items 123 from the computing device 103 (FIG. 1). For instance, the additional items 123 may have been identified by an item search executed by the electronic commerce system 116 (FIG. 1), as described above. In one embodiment, the predefined number may depend on the capacity of the memory accessible by the client 106.

In another embodiment, the client side application 136 receives images 126 and information 129 one item 123 at a time. In this example, the client side application 136 may obtain additional content for items 123 when such content is to be displayed based on user action. The client side application 136 proceeds to box 419 only if a request for additional content is required. Otherwise, the client side application 136 returns to box 406 to await further action by the user.

In box 419, the client side application 139 submits a request for and receives content associated with additional items 123 from the page generator 119. For instance, the client side application 136 requests images 126 and information 129 associated with one or more additional items 123. Once received from the computing device 103, the content associated with such additional items 123 is then stored in the cache memory accessible by the client 106 as described above.

Note that if all content including images 126 and information 129 associated with all items 123 responsive to a search are downloaded and stored locally in the client device 106 with the initial download of the network page 136, then box 416 and 419 may be omitted. For instance, all the content may be communicated to the client 106 as a compressed object file where no further communication by the client 106 to obtain additional content is necessary.

Figure 5:
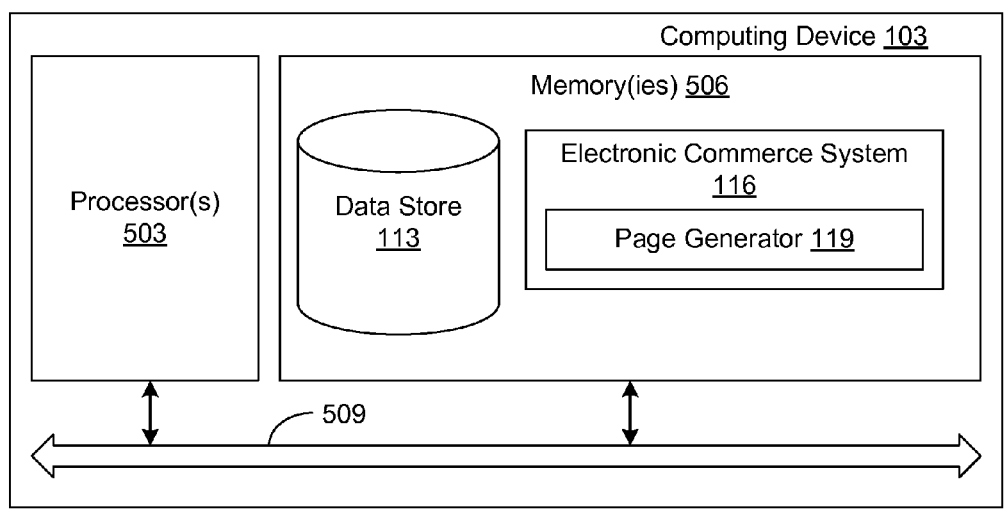
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are an electronic commerce system 116, a page generator 119, and potentially other applications. Also stored in the memory 506 may be a data store 113 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce system 116, the page generator 119, the client side application 139, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of one example of an implementation of the client side application 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 116, the page generator 119, and/or the client side application 139 that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
    code that generates a network page comprising an image layer including a first image depicting a first item available for purchase in an electronic commerce system, the image layer being superimposed over an information layer depicting first information associated with the first item, wherein the first information comprises at least one of purchasing information, an item description, a shipping estimation, a size selector, and a color selector;
    code that includes at least one navigation control in the network page, the at least one navigation control being configured for browsing, the at least one navigation control comprising a previous item button, a next item button, and a slideshow button;
    wherein the network page includes a client side application in the network page that depicts shifting the first image out of the image layer and shifting a second image into the image layer upon manipulation of the at least one navigation control, the second image depicting a second item available for purchase in an electronic commerce system, wherein the shifting is executed in a horizontal direction relative to a display device; and
    code that replaces the first information in the information layer with a second information associated with the second item contemporaneously with the shifting.

2. The computer-readable medium of claim 1, wherein the client side application is configured to implement an automatic shifting of the first image out of the image layer and the second image into the image layer on a periodic basis upon manipulation of the slideshow button.

3. A system, comprising:
    at least one computing device; and
    a page generator executable in the at least one computing device, the page generator that generates network content that includes a client side application comprising:
        logic that renders on a client device a first image in an image layer and a first information in an information layer, the first image being of a first item available for purchase in an electronic commerce system and the first information being associated with the first item;
        logic that renders on the client device a first shifting of the first image out of the image layer and a second image into the image layer, the second image being of a second item;
        logic that renders on the client device a second shifting of the first information out of the information layer and a second information into the information layer, the second information being associated with the second item; and
        wherein the second shifting of the first information out of the information layer and the second information into the information layer occurs contemporaneously with the first shifting of the first image out of the image layer and the second image into the image layer.

4. The system of claim 3, wherein the page generator further comprises logic that communicates an additional image of an additional item and additional information associated with the additional item to the client device upon a request received from the client device.

5. The system of claim 3, wherein both the first shifting and second shifting occur upon manipulation of a navigation control rendered on a display of the client device.

6. The system of claim 3, wherein the first information comprises at least one of purchasing information, an item description, a shipping estimation, a size selector, and a color selector.

7. The system of claim 3, wherein the first shifting is executed in a horizontal direction relative to a display device.

8. The system of claim 3, wherein the first shifting is executed in a vertical direction relative to a display device.

9. The system of claim 3, wherein the information layer is superimposed over the image layer.

10. The system of claim 3, wherein both the first shifting and the second shifting are executed automatically on a periodic basis upon manipulation of an auto scrolling control.

11. The system of claim 3, wherein the client side application causes at least one of a previous navigation button and a next navigation button to be rendered on a display of the client device.

12. The system of claim 3, wherein the network content further comprises a network page, and the client side application is embedded in the network page.

13. A method, comprising the steps of:
    rendering for display, in a client device, in a network page a first item image in an image layer and a first information in an information layer, the first item image depicting a first item, and the first information describing the first item; and
    executing, in the client device, a client side application embedded in the network page to render a shifting of the first item image out of the image layer and a shifting of a second item image of a second item into the image layer, and to replace the first information in the information layer with a second information describing the second item contemporaneously with the shifting of the first item image out of the image layer and the shifting of the second item image into the image layer.

14. The method of claim 13, further including the step of downloading, in the client device, for rendering at least one additional image and at least one additional item information describing at least one additional item.

15. The method of claim 13, wherein the rendering of the shifting occurs upon manipulation of one of a previous navigation button and a next navigation button included as part of the network page.

16. The method of claim 13, wherein the shifting is executed in a horizontal direction relative to a display device.

17. The method of claim 13, wherein the shifting is executed in a random direction relative to a display device.

18. The method of claim 13, wherein the information layer is superimposed over the image layer.

* * * * *